United States Patent [19]
Rood et al.

[11] Patent Number: 4,527,755
[45] Date of Patent: Jul. 9, 1985

[54] HINGED VISOR-TYPE DOOR FOR TAPE CASSETTE

[75] Inventors: Robert M. Rood, Woodbury; James J. Wulfing, Afton, both of Minn.

[73] Assignee: Minnesota Mining and Manufacturing Company, St. Paul, Minn.

[21] Appl. No.: 542,414

[22] Filed: Oct. 17, 1983

[51] Int. Cl.³ .......................... G03B 1/04; G11B 15/32
[52] U.S. Cl. ...................................... 242/199; 220/337
[58] Field of Search ............................... 242/197–200; 220/334, 337; 206/387, 389; 360/132, 137; 352/72–78

[56] References Cited

U.S. PATENT DOCUMENTS

| 3,809,219 | 5/1974 | Esashi | 220/334 |
| 4,363,456 | 12/1982 | Goto | 242/197 |
| 4,386,746 | 6/1983 | Okamura et al. | 242/199 |
| 4,418,373 | 11/1983 | Fujimori et al. | 360/132 |
| 4,449,677 | 5/1984 | Ohta et al. | 242/199 |

FOREIGN PATENT DOCUMENTS 2091213 1/1982 United Kingdom .

Primary Examiner—Leonard D. Christian
Attorney, Agent, or Firm—Donald M. Sell; James A. Smith; David W. Anderson

[57] ABSTRACT

A videotape cassette has a visor-type door, at each end of which is an ear or corner part at which a pin hinges the door to a housing. As in the prior art, the door is biased to either a fully opened or fully closed position. In the novel cassette, the biasing results from a free-standing finger formed in a wall of the housing, which finger acts as a spring against a squarish platform on the inner face of an ear of the door.

9 Claims, 4 Drawing Figures

HINGED VISOR-TYPE DOOR FOR TAPE CASSETTE

FIELD OF THE INVENTION

The invention concerns a tape cassette having an elongated visor-type door to protect or expose a tape extending along the front of the cassette which includes means for biasing the door to either a fully opened or fully closed position. The invention specifically concerns the biasing means.

BACKGROUND ART

The VHS-C (compact) videotape cassette has a visor-type door which, as shown in U.K. patent application No. 2,091,213, is biased to either a fully opened or fully closed position by a U-shaped leaf spring acting against a slide rod. Standard specifications for the VHS-C cassette require the door to snap to either the fully opened or fully closed position if moved to within 20° of either position. The full size VHS videotape cassette and the Betamax videotape cassette have similar visor-type doors which are biased only to the closed position by metal coil springs.

In the door-biasing mechanism of the U.K. application, a supply of springs and slide rods must be available to the assembler. If the assembled cassette is dropped onto a hard surface, a plastic part holding that spring may break.

DISCLOSURE OF THE INVENTION

Like the tape cassette of U.K. patent application No. 2,091,213, the cassette of the invention comprises a housing and an elongated visor-type lid or door, at each end of which is a corner part or ear at which a pin hinges the door to the housing. At least one ear has first and second edges which intersect at substantially right angles. A pin hinges each ear to the housing. A spring mechanism rests against said first edge while the door is closed and against said second edge while the door is open. The spring mechanism is under flexure when resting against the intersection of said first and second edges while the door is partially open and thus exerts a force tending to rotate the door to either its fully opened or fully closed position.

The novel cassette differs from that of the U.K. patent application in that the side of the housing adjacent the ear is cored out to provide a resilient free-standing finger which provides said spring mechanism. Preferably, there is a squarish platform on the inner face of the ear, and the aforementioned first and second edges are edges of the platform. Conveniently, said first and second edges respectively extend substantially perpendicular and parallel to the inner face, and the first edge faces inwardly with respect to the housing when the door is closed.

The housing may be plastic molded in two parts, one of which includes the free-standing finger. There is no separate spring or slide rod as in the cassette of the U.K. application. The door may also be plastic molded in one piece. If one were to drop the novel tape cassette onto a hard surface, the door might fall off, but any breakage is unlikely except possibly one of the hinging pins. For that reason, each pin preferably projects from the inner face of an ear of the door and fits into an opening in the housing, thus making it necessary only to replace the door if a pin should break. Alternatively, each pin could project from the housing and fit into an opening in the inner face of the ear.

By grooving the first and second edges of the platform and rounding the finger to fit the grooves, the finger would be thus constrained against slipping out of position if the cassette were dropped. However, flat surfaces are preferred for ease of molding, and testing has revealed no problem with a flat finger slipping out of position.

While a single platform and cooperating free-standing finger should be sufficient, a second platform and finger may be located at the other end of the door.

The plastic of the housing and door should be resilient and tough so that the finger can be flexed repeatedly during opening and closing of the door without any danger of breakage or of reducing the force it exerts against the platform. In this respect, polycarbonate plastic and acrylonitrile-butadiene-styrene (ABS) plastic are preferred while being reasonably inexpensive. Other plastics which should be useful include high-impact polystyrene.

Preferably the finger or fingers are under slight flexure when the door is either fully closed or fully opened in order to insure against looseness. Hence, the finger may experience some plastic flow, thus gradually decreasing the force it applies against the platform. However, it is unlikely that plastic flow would reduce the force to zero, even after years of storage and use.

THE DRAWING

In the drawing

Figure 1:
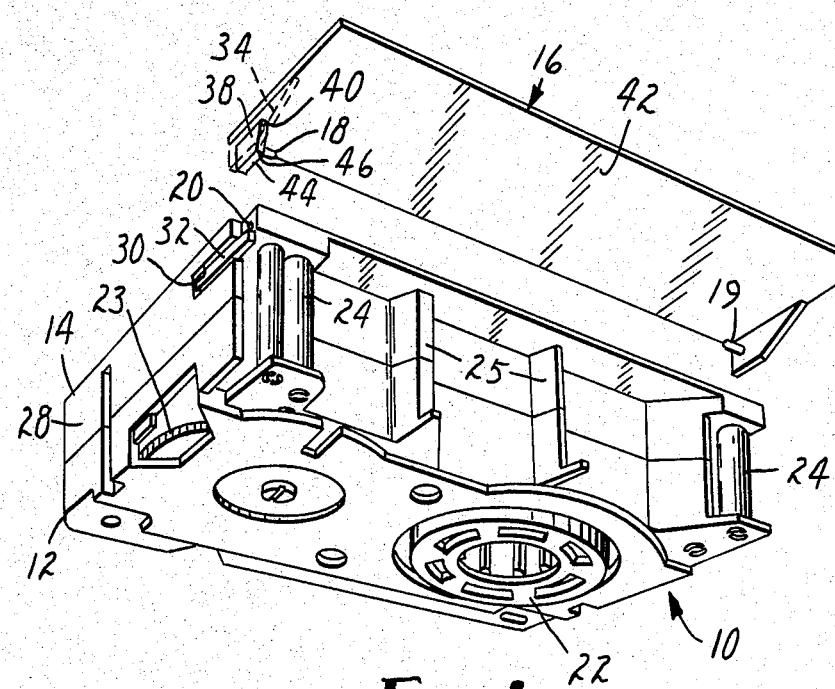
FIG. 1 is a schematic perspective view of a VHS-C tape cassette of the invention with its visor-type door disassembled.
Figures 2, 3:
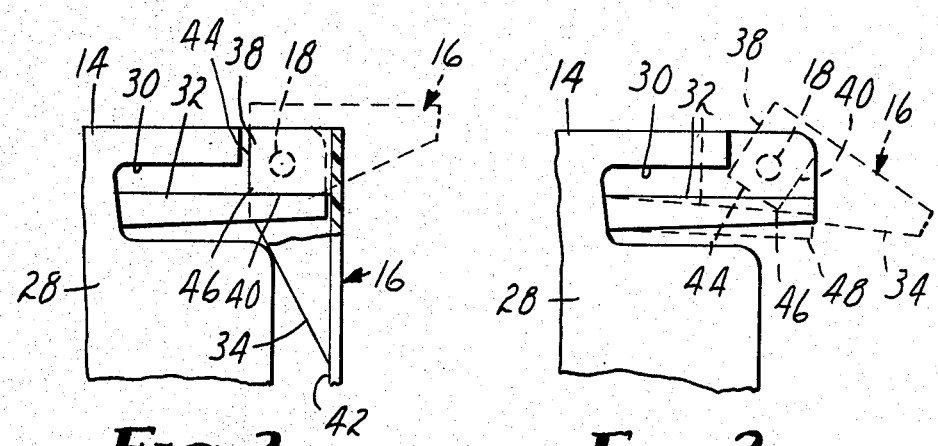
FIG. 2 is an enlarged fragmentary edge view of the door-biasing mechanism of the cassette of FIG. 1, with the door removed.
FIG. 3 is a view similar to FIG. 2 except with the door in place.

The tape cassette shown in FIGS. 1–3 has a housing 10 including a base 12 and a cover 14 to which an elongated visor-type door 16 can be hinged by pins 18 and 19 which fit into openings in the housing, one opening 20 being shown. Within the housing are a pair of tape spools 22 and 23 between which a length of tape (not shown) passes over rollers 24 and front projections 25 along the front of the housing 10 when the tape cassette is not in use. The door 16, when in the opened position, does not interfere with the drawing of tape out from the housing 10.

The side wall 28 of the housing 10 is cored out at 30 (see FIGS. 2 and 3) to provide a resilient free-standing finger 32. The adjacent end of the door 16 has a corner part or ear 34 on the inner face of which is a squarish platform 38. The platform has a first flat edge 40 (see FIG. 3) extending perpendicular to the broad inner face 42 of the door 16. The platform 38 has a second flat edge 44 extending parallel to the broad inner face 42 of the door 16. As seen in FIG. 3, the finger 32 rests against said first edge 40 while the door 16 is fully closed, and against said second edge 44 while the door is fully opened (dashed lines). When the door is partly open, the finger 32 rests against the intersection 46 of the edges 40 and 44 as shown in FIG. 2 by dashed lines 48. When less than half open, the door is biased by the finger 32 toward its fully closed position. When the door is more than half open, the finger 32 biases the door toward its fully opened position.

When the tape cassette shown in FIGS. 1-3 was molded of polycarbonate plastic, the door would snap to either the fully opened or fully closed position whenever within 20° of that position.

Figure 4:
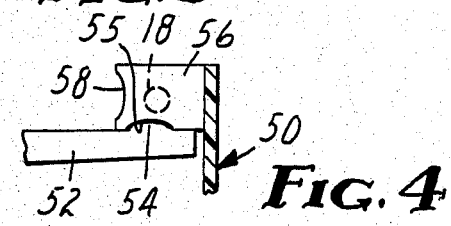
FIG. 4 is a detail which schematically illustrates the free-standing finger and cooperating platform of a second cassette embodying the invention.

FIG. 4 fragmentally shows another embodiment of the invention which is similar to that of FIGS. 1-3 except for the construction of the door biasing mechanism. When the door 50 is fully closed as shown, a resilient free-standing finger 52 has a protuberance 54 which fits into a depression of a first edge 55 of a platform 56. When the door is fully open, the protuberance 54 fits into a depression of a second edge 58 of the platform 56 which otherwise is similar to the platform 38 of FIGS. 1-3.

EXAMPLE

A VHS-C cassette as shown in FIGS. 1-3 was made by molding each of the base 12, cover 14, and door 16 of polycarbonate, with significant dimensions of the door-biasing mechanism as follows:

Finger 32
 length: 8.0 mm
 width (at base): 1.0 mm
 thickness (at base): 1.0 mm
Sidewall 28
 thickness: 1.5 mm
Edge 40
 length: 3.5 mm
 width: 0.9 mm
Edge 44
 length: 2.5 mm
 width: 0.9 mm.

We claim:

1. Tape cassette comprising a housing, an elongated visor-type door, at each end of which is an ear extending orthogonally to the inner face of the door, at least one ear having first and second edges which intersect at substantially right angles, a pin hinging each ear to the housing, and a spring mechanism which rests against said first edge when the door is closed and against said second edge while the door is open and is under flexure when resting against the intersection of those edges while the door is partially open, wherein the improvement comprises
 a resilient free-standing finger which is said spring mechanism.

2. Tape cassette as defined in claim 1 wherein said first and second edges respectively extend substantially perpendicular and parallel to the inner face of the door, and the first edge faces inwardly when the door is closed.

3. Tape cassette as defined in claim 2 and having a squarish platform on the inner face of said one ear, and said first and second edges are edges of the platform.

4. Tape cassette as defined in claim 3 having a platform as defined on the inner face of each ear and having a free-standing finger acting against edges of each platform.

5. Tape cassette as defined in claim 3 wherein said edges and the contacting face of the finger are flat.

6. Tape cassette as defined in claim 3 wherein each of said edges is concave and the contacting face of the finger is convex and mates with the concave edges when the door is either fully opened or fully closed.

7. Tape cassette as defined in claim 1 wherein each pin projects from the inner face of an ear and fits into an opening in the housing.

8. Tape cassette as defined in claim 1 wherein each pin projects from the housing and fits into an opening in an ear.

9. Tape cassette as defined in claim 1 wherein each of the door and the housing including its spring is molded plastic.

* * * * *